United States Patent [19]

Di Ruocco et al.

[11] Patent Number: 5,283,292

[45] Date of Patent: Feb. 1, 1994

[54] ACRYLIC-BASED STRUCTURAL ADHESIVES

[75] Inventors: Vittorio Di Ruocco, Novara; Liliana Gila, Trino; Fabio Garbassi, Novara, all of Italy

[73] Assignee: Ministero dell'Universita' e della Ricerca Scientifica e Tecnologica, Rome, Italy

[21] Appl. No.: 967,129

[22] Filed: Oct. 27, 1992

[30] Foreign Application Priority Data

Oct. 29, 1991 [IT] Italy .............. MI91 A 002863

[51] Int. Cl.$^5$ ............................................ C08L 23/34
[52] U.S. Cl. .................................. 525/164; 525/157; 156/334
[58] Field of Search ............... 525/164, 157; 156/334

[56] References Cited

U.S. PATENT DOCUMENTS

| 3,203,941 | 8/1965 | Krieble. | |
|---|---|---|---|
| 3,890,407 | 6/1975 | Briggs | 525/164 |
| 4,113,792 | 9/1978 | Pastor | 525/155 |
| 4,170,612 | 10/1979 | Pastor | 525/101 |
| 4,263,419 | 4/1981 | Piestert | 525/305 |
| 4,773,957 | 9/1988 | Briggs | 156/310 |

FOREIGN PATENT DOCUMENTS

| 0251513 | 1/1988 | European Pat. Off. . |
| 0334155 | 9/1989 | European Pat. Off. . |
| 1909992 | 10/1969 | Fed. Rep. of Germany . |
| 2193863 | 2/1974 | France . |

OTHER PUBLICATIONS

Chem. Abstracts Report.
Chemical Abstracts, vol. 103, No. 14, Oct. 7, 1985, AN 105899y, Loctite Corporation "Anaerobic Adhesives Containing Maleimides having Improved Thermal Resistance", p. 43.

*Primary Examiner*—James J. Seidleck
*Assistant Examiner*—I. Zemel
*Attorney, Agent, or Firm*—Oblon, Spivak, McClelland, Maier & Neustadt

[57] ABSTRACT

The invention provides acrylic-based heat-resistant bicomponent structural adhesives comprising:
  a) a first adhesive component consisting of:
   an elastomer;
   a monofunctional acrylic monomer;
   a free radical generator;
   a solution stabilizer;
   an adhesion promoter;
   a cross-linking agent;
   a heat stabilizer for the adhesive, chosen from maleimide derivates containing acrylic residues; and
  b) a second component activating the first adhesive component and consisting of:
   a mixture of aldehyde-amine condensation products;
   an organic salt of a metal of the first transition series of low oxidation state.

13 Claims, No Drawings

ACRYLIC-BASED STRUCTURAL ADHESIVES

This invention relates to acrylic-based structural adhesives. More particularly, the invention relates to heat-resistant bicomponent acrylic-based structural adhesives. Acrylic-based structural adhesives are known in the art. They are described for example in U.S. Pat. Nos. 3,591,438, 3,594,451, 3,642,750, 3,203,941 and 3,890,407.

Of these, U.S. Pat. No. 3,890,407 describes adhesive compositions in which the critical components are essentially an elastomeric polymer based on chlorosulphonated polyethylene or a mixture of sulphonyl chloride and chlorinated polyethylene, a vinyl monomer, a polymerization catalyst consisting of a free radical generator, a polymerization initiator, an adhesion promoter and a component activating the adhesive (catalyst).

These compositions show good characteristics in terms of bonding force, low fragility, very short setting time, good impact strength, ability to achieve strong joints even with poorly cleaned surfaces, and high tenacity after cross-linking, although their adhesive capacity decreases with increase in the temperature at which they are used.

The applicant has now discovered a new class of bicomponent acrylic adhesives in which heat stabilizers perfectly compatible with the adhesive constituents are used which have never been described in the literature and which overcome the drawback of reduction in adhesive capacity with increasing temperature. The present invention therefore provides acrylic-based heat-resistant bicomponent structural adhesives comprising:

a) a first adhesive component consisting of a solution of an elastomer in a monofunctional acrylic monomer containing a free radical generator, a solution stabilizer, an adhesion promoter, a cross-linking agent, and an adhesive heat stabilizer of general formula (I):

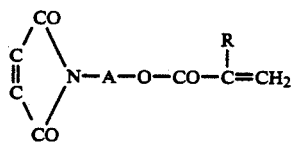

where R is H or $CH_3$, and A is a cycloalkyl radical containing from 5 to 10 carbon atoms or an aryl radical containing from 6 to 12 carbon atoms, and with the residue $[-OCOC(R)=CH_2]$ in the ortho, meta or para position;

b) a second component activating the first adhesive component and consisting of a mixture of aldehyde-amine condensation products in which an organic salt of a metal of the first transition series of low oxidation state is dissolved. The preferred products of general formula (I) according to the present invention are those in which A is a cyclohexyl or a phenyl. Particularly preferred are phenylmaleimide methacrylate (MPM) and phenylmaleimide acrylate.

Examples of acrylic monomers usable for forming the adhesives of the present invention are: methyl methacrylate, ethyl methacrylate, acrylonitrile, methacrylonitrile, methyl acrylate, ethyl acrylate, butyl methacrylate, cyclohexyl methacrylate, hexyl methacrylate, lauryl methacrylate, butyl acrylate, cyclohexyl acrylate, hexyl acrylate, lauryl acrylate, acrylamide and methacrylamide.

The preferred monomers are methyl methacrylate, ethyl methacrylate and cyclohexyl methacrylate. The elastomer used in the adhesives of the present invention is preferably a chlorosulphonated polymer chosen from chlorosulphonated polyolefins.

The preferred elastomer is chlorosulphonated polyethylene, although chlorosulphonated copolymers of ethylene with small quantities of propylene or other olefins can be used. Chlorosulphonated polyethylene is obtained by known methods, by reacting linear or branched polyethylene with sulphuryl chloride or with $SO_2$ and chlorine. It is produced by Du Pont and marketed under the name of Hypalon.

Alternatively, the chlorosulphonated polymers used can be mixtures of sulphonyl chlorides with chlorinated polyethylene or chlorosulphonated polyethylene.

The sulphonyl chlorides can be chosen from alkyl sulphonyl chlorides containing from 1 to 12 carbon atoms such as methane or butane sulphonyl chloride, aryl sulphonyl chlorides containing from 6 to 24 carbon atoms such as benzene or toluene sulphonyl chloride, and sulphonyl chlorides containing hetero atoms such as diphenylether-4,4'-disulphonyl chloride. The chlorosulphonated polymer is added to the acrylic monomer in a quantity which can vary within wide limits, although it is preferable to use a quantity of between 25 and 40 wt % on the total component a).

As an alternative to the chlorosulphonated polymer alone, mixtures thereof with other natural or synthetic elastomers soluble in the acrylic monomer can be used such as polybutadiene, butadiene/acrylonitrile copolymers, elastomeric polyacrylates, polyisoprene, polychloroprene, polyurethane elastomers, fluorinated elastomers etc.

A solution stabilizer is added to the mixture obtained in a quantity of between 0.1 and 2 wt % on the total of a), it being chosen from quinones and hydroquinones such as dihydroquinone, dihydroquinone monomethyl ether, anthraquinone, di-tert-butyl-para-cresol etc.

The preferred stabilizer is di-tert-butyl-para-cresol. Adhesion promoters chosen from unsaturated mono and dicarboxylic acids are added to the monofunctional acrylic monomer solution in a quantity of up to 20 wt % on the total of a).

The preferred promoter is methacrylic acid.

The cross-linking additive of the first adhesive component is chosen for example from acrylic or methacrylic esters of diols, triols or polyols, in particular ethyleneglycol diacrylate or dimethacrylate.

This is added to the solution in a quantity of between 0.1 and 0.2 wt % on the total of a).

A further additive of the first adhesive component is the free radical generator.

Free radical generators are known in the literature and described in "Free Radicals in Solution", C. Walling, J. Wiley & Sons, New York, 1957 and in "The Chemistry of Organic Film Formers", D. H. Solomon, J. Wiley & Sons, New York, 1967 page 135. Preferred radical generators are organic peroxides and hydroperoxides such as cumene hydroperoxide, benzoyl peroxide, lauroyl peroxide, methyl ethyl ketone hydroperoxide, cyclohexanone peroxide etc., used in a quantity of between 0.1 and 2 wt % on the total of a).

The final agent of the mixture a) is the heat stabilizer of general formula (I), used in a quantity of between 1 and 10 wt % on the sum of the acrylic monomer, the adhesion promoter and the cross-linking agent.

The adhesive component a) obtained in this manner has a Brookfield viscosity of between 10,000 and 70,000 cPa.sec.

The products of general formula (I) can be prepared by the following reaction:

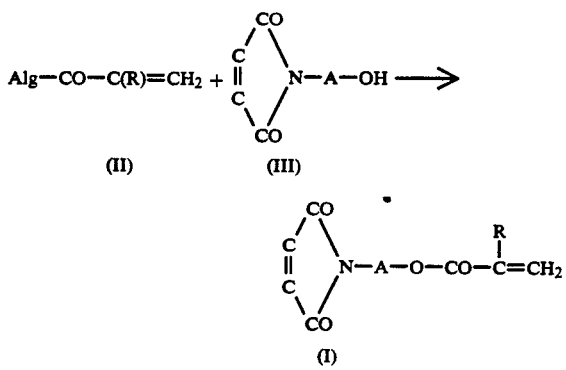

where R and A have the aforesaid meanings and Alg is a halogen, in the presence of 3Å molecular sieves and solvents such as dichloroethane at a temperature of between 60° and 90° C. The compound (III) is known and can be synthesized as described in Japanese patents 61/106,554 (1986), 79/66,671 (1979) and 79/66,670 (1979).

The second component, which activates the adhesive component, comprises an activator chosen from a mixture of aldehyde-amine condensation products in which an activation promoter consisting of an organic salt of a metal of the first transition series of low oxidation state is dissolved.

Various aldehydes and primary amines are suitable for preparing the adhesive activation component. The aldehydes are preferably aliphatic and contain radicals with from 1 to 12 carbon atoms.

Examples of aldehydes which can be used for preparing the adhesive activation component according to the present invention are acetaldehyde, butyraldehyde, propionaldehyde, cyclopentanal, hexanal, cyclohexanal, hydrocinnamaldehyde, heptanal, decanal, dodecanal etc.

Any aliphatic or aromatic primary amine with up to 18 carbon atoms can be used for preparing the activators of the present invention. Examples of such amines are ethylamine, butylamine, pentylamine, cyclopentylamine, hexylamine, cyclohexylamine, octylamine, decylamine, dodecylamine, hexadecylamine, octadecylamine, aniline, tolyl amine, xylyl amine etc.

Preferred substances for preparing the adhesive activating component are butyraldehyde-aniline condensation products available commercially under the name of VAMAC 808 from the Du Pont Company.

The activation promoter agent is an organic salt of a metal of the first transition series of low oxidation state soluble in aldehyde-amine condensation products. It is generally used in a concentration not exceeding 0.5 wt % on the total of component b). Any metal of the first transition series can be used for preparing the activation promoter, although cobalt, nickel, copper, manganese, iron and vanadium are preferred.

Examples of organic salts which can be used as activation promoters are copper saccharinate, copper paratoluenesulphinate, cobalt acetyl acetonate, iron lactate, iron gluconate etc. Copper (I) saccharinate is the preferred activation promoter. The structural adhesives of the present invention are characterised by:

a setting time, measured as the time after which it is not possible to separate two test pieces by shear force, of less than 90 seconds;

shear strength, measured in accordance with ASTM D 1002-72, of between 15 and 25 $N/mm^2$;

shear strength after heating to 150° C., of between 12 and 18 $N/mm^2$

Said adhesives are applied by the primer method, by which the adhesive component is applied to one part and the activating component is applied to the other part to be joined together. With the heat stabilizer present they can be used not only at ambient temperature but also at higher temperature, both during setting and during final use.

The adhesives of the present invention can be used on porous or smooth surfaces without it being necessary to pre-treat the surfaces to which they are applied.

Materials which can be bonded by the composition of the present invention include steel, aluminium, copper, brass, polar polymer materials, wood, glass, paper, prepainted surfaces etc. Some non-limiting illustrative examples are given hereinafter for the purpose of clarifying the present invention and for demonstrating its implementation.

EXAMPLE 1

Synthesis of N-[4-methacrylatephenyl]maleimide 12 g (0.064 moles) of N-[4-hydroxyphenyl]maleimide dissolved in 400 cc of dichloroethane are placed in a two-neck flask fitted with a mechanical agitator, condenser, nitrogen valve and dropping funnel.

16 g of molecular sieve (Union Carbide Type 3A) dried at 100° C. under vacuum for 16–18 hours are added, followed by 30 cc (0.32 moles) of distilled methacryloylchloride, and the mixture is heated under reflux (80°–90° C.) for 26 hours, adding fresh molecular sieve every 7–8 hours.

The solution is then washed with a 2% NaOH solution, then with water, and dried over anhydrous sodium sulphate. The product, obtained by evaporating the solvent, is finally washed with hexane.

7.3 g of N-[4-methacrylatephenyl]maleimide are obtained with a yield of 44.4%.

Melting point: 150°–152° C.

IR (KBr): imide CO 1720 $cm^{-1}$, ester CO 1740 $cm^{-1}$.

$^1$H-NMR (200 MHz, $CDCl_3$): δ 2.1 (methyl H); δ 5.8–6.35 (ethylene H); δ 6.85 (maleimide H); δ 7.2–7.4 (aromatic H).

EXAMPLE 2 (comparative)

61.2 g of methylmethacrylate (MMA) are added to a mixture consisting of 18.5 g of chlorosulphonated polyethylene (known commercially as Hypalon 20), 9.3 g of acrylonitrile-butadiene rubber (known commercially as Europrene N3360), 9.3 g of methacrylic acid (MA) and 0.9 g of ethyleneglycol-dimethacrylate (EGDMA).

The result is mixed at ambient temperature until the entire polymer has completely dissolved (time required: about 48 hours). The adhesive paste obtained is completed by adding 0.3 g of di-tert-butyl-para-cresol (BHT) and 0.5 g of a free radical generator in the form of cumene hydroperoxide (CHP).

The Brookfield viscosity of the paste is 60,000 mPa.sec. Steel test pieces of dimensions 120×25×1.5 mm are prepared and treated with abrasive paper No. 120.

A film of about 0.5 mm thickness of paste is spread on one test piece, and the activator consisting of the product of the condensation reaction between butyraldehyde and aniline containing 0.01 wt % of copper (I) introduced as copper saccharinate is spread on another test piece.

The two test pieces are pressed together under a pressure of about 2 N/mm².

The adhesive is post-crosslinked at 100° C. for one hour from the pressing together of the test pieces.

The following results are obtained:
setting time: 30 seconds;
shear strength: 20 N/mm²;
shear strength after heating to 150° C.: 11.5 N/mm².

EXAMPLE 3

The test described in Example 2 is repeated, adding to the original formulation 2.14 g of the phenylmaleimide methacrylate (MPM) of Example 1.

This quantity corresponds to 3 wt % calculated on the sum of the acrylic monomers present.

The following results are obtained:
setting time: 30 seconds;
shear strength: 20 N/mm²;
shear strength after heating to 150° C.: 14.0 N/mm².

EXAMPLE 4

The test described in Example 2 is repeated, adding to the original formulation 3.57 g of the phenylmaleimide methacrylate (MPM) of Example 1.

This quantity corresponds to 5 wt % calculated on the sum of the acrylic monomers present.

The following results are obtained:
setting time: 30 seconds;
shear strength: 20 N/mm²;
shear strength after heating to 150° C.: 15.0 N/mm².

EXAMPLE 5 (comparative)

34.5 g of methylmethacrylate (MMA) are added to a mixture consisting of 30 g of chlorosulphonated polyethylene (known commercially as Hypalon 20), 33.8 g of methacrylic acid and 1.0 g of ethyleneglycol-dimethacrylate (EGDMA).

The result is mixed at ambient temperature until the entire polymer has completely dissolved (time required: about 24 hours). The adhesive paste obtained is completed by adding 0.3 g of di-tert-butyl-para-cresol (BHT) and 0.4 g of a free radical generator of usual type (initiator) in the form of cumene hydroperoxide (CHP).

The Brookfield viscosity of the paste is 34,000 mPa.-sec. Steel test pieces of dimensions 120×25×1.5 mm are prepared and treated with abrasive paper No. 120.

A film of about 0.5 mm thickness of paste is spread on one test piece, and the activator consisting of the product of condensation of butyraldehyde and aniline containing 0.1 wt % of copper (I) introduced as copper saccharinate is spread on another test piece. The two test pieces are pressed together under a pressure of about 2 N/mm².

The adhesive is post-crosslinked at 100° C. for one hour from the pressing together of the test pieces.

The following results are obtained:
setting time: 30 seconds;
shear strength: 20N/mm²;
shear strength after heating to 150° C.: 10.0N/mm².

EXAMPLE 6

The test described in Example 5 is repeated, adding to the original formulation 1.37 g of the phenylmaleimide methacrylate (MPM) of Example 1.

This quantity corresponds to 2 wt % calculated on the sum of the acrylic monomers present.

The following results are obtained:
setting time: 30 seconds;
shear strength: 20 N/mm²;
shear strength after heating to 150° C.: 15.0 N/mm².

EXAMPLE 7

The test described in Example 5 is repeated, adding to the original formulation 2.05 g of the phenylmaleimide methacrylate (MPM) of Example 1.

This quantity corresponds to 3 wt % calculated on the sum of the acrylic monomers present.

The following results are obtained:
setting time: 30 seconds;
shear strength: 20 N/mm²;
shear strength after heating to 150° C.: 16.0 N/mm².

We claim:

1. Acrylic-based heat-resistant bicomponent structural adhesives comprising:
   a) a first adhesive component consisting of a solution of a chlorosulphonated polyolefin alone or mixed with
      1) a $C_1$-$C_{12}$ alkyl sulphonyl chloride or a $C_6$-$C_{24}$ aryl sulphonyl chloride, or
      2) natural or synthetic elastomers soluble in an acrylic monomer,
   in an acrylic monomer containing a free radical generator, a solution stabilizer, an adhesion promoter, a cross-linking agent, and an adhesive heat stabilizer of formula (I):

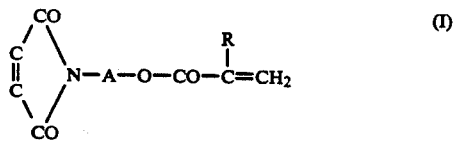

where R is H or $CH_3$, and A is a cycloalkyl radical containing from 5 to 10 carbon atoms or an aryl radical containing from 6 to 12 carbon atoms, and with the residue in the ortho, meta or para position;
   b) a second component activating the first adhesive component and consisting of a mixture of aldehyde-amine condensation products in which an organic salt of a metal of the first transition series of low oxidation state is dissolved.

2. Adhesives as claimed in claim 1, wherein the heat stabilizer is phenylmaleimide methacrylate or phenylmaleimide acrylate.

3. Adhesives as claimed in claim 1 or 2, wherein the heat stabilizer of formula (I) is used in a quantity of between 1 and 10 wt % of the sum of the acrylic monomer, the adhesive promoter and the cross-linking agent.

4. Adhesives as claimed in any one of claims 1 or 2, wherein the chlorosulphonated polyolefin or copolyolefin is a chlorosulphonated polyolefin.

5. Adhesives as claimed in any one of claims 1 or 2, wherein the chlorosulphonated polyolefin or copolyolefin is present in the acrylic monomer in a quantity of between 25 to 40 wt % based on the total wt % of component a).

6. Adhesives as claimed in any one of claims 1 or 2, wherein the stabilizer for solution a) is selected from the group consisting of quinones and hydroquinones and is present in a quantity of between 0.1 and 2 wt % based on the total wt % of component a).

7. Adhesives as claimed in any one of claims 1 or 2, wherein the adhesion promoter is selected from the group consisting of unsaturated mono and dicarboxylic acids and is present in a quantity of up to 20 wt % based on the total wt % of component a).

8. Adhesives as claimed in any one of claims 1 or 2, wherein the free radical generator is selected from the group consisting of organic peroxides and hydroperoxides and is present in a quantity of between 0.1 and 2 wt % based on the total wt % of component a).

9. Adhesives as claimed in any one of claims 1 or 2, wherein the cross-linking agent is selected from the group consisting of acrylic or methacrylic esters of diols, triols and polyols, and is present in a quantity of between 0.1 and 2 wt % based on the total wt % of a).

10. Adhesives as claimed in any one of claims 1 or 2, wherein the mixture of aldehyde-amine condensation products consists of butyraldehyde-aniline condensation products.

11. Adhesives as claimed in any one of claims 1 or 2, wherein the activation promoter is an organic salt of a metal of the first transition series and is used in a concentration not exceeding 0.5 wt % based on the total wt % component b).

12. Adhesives as claimed in any one of claims 1 or 2, having:
   a setting time, measured as the time after which it is not possible to separate two test pieces by shear force, of less than 90 seconds;
   a shear strength, measured in accordance with ASTM D 1002-72, of between 15 and 25 N/mm$^2$;
   a shear strength after heating to 150° C., of between 12 and 18 N/mm$^2$.

13. A method for bonding materials selected from the group consisting of steel, aluminum, copper, brass, polar polymers, wood, glass and prepainted surfaces comprising the steps of applying the first adhesive component of claim 1 or claim 2 to a first surface of one of said materials to be bonded, applying the second adhesive component of claim 1 or claim 2 to a second surface of one of said materials which is to be bonded to said first surface, and joining the first and the second surfaces together.

* * * * *